(12) United States Patent
Pope et al.

(10) Patent No.: US 8,484,099 B1
(45) Date of Patent: Jul. 9, 2013

(54) METHOD, MEDIUM, AND SYSTEM FOR BEHAVIOR-BASED RECOMMENDATIONS OF PRODUCT UPGRADES

(75) Inventors: Elmore Eugene Pope, Sammamish, WA (US); Scott Allen Mongrain, Seattle, WA (US); Joseph Xavier, Seattle, WA (US); Srikanth Thirumalai, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/367,272

(22) Filed: Feb. 6, 2012

(51) Int. Cl.
*G06Q 30/00* (2012.01)

(52) U.S. Cl.
USPC ............................................ 705/26.7

(58) Field of Classification Search
USPC ............................................ 705/26.7
See application file for complete search history.

(56) References Cited

U.S. PATENT DOCUMENTS

| | | | |
|---|---|---|---|
| 6,185,558 B1 | 2/2001 | Bowman et al. | |
| 6,865,546 B1 | 3/2005 | Song | |
| 6,912,505 B2 | 6/2005 | Linden et al. | |
| 6,963,867 B2 | 11/2005 | Ford et al. | |
| 7,328,216 B2 | 2/2008 | Hofmann et al. | |
| 7,376,588 B1 | 5/2008 | Gregov et al. | |
| 7,536,322 B1 | 5/2009 | Selinger et al. | |
| 7,668,821 B1 | 2/2010 | Donsbach et al. | |
| 7,836,051 B1 | 11/2010 | Mason | |
| 7,949,659 B2 | 5/2011 | Chakrabarti et al. | |
| 7,953,740 B1 | 5/2011 | Vadon et al. | |
| 7,962,367 B1* | 6/2011 | Fuisz et al. | 705/26.1 |
| 8,032,425 B2 | 10/2011 | Yi | |
| 8,090,621 B1 | 1/2012 | Chakrabarti et al. | |
| 8,145,512 B1* | 3/2012 | Henne et al. | 705/7.11 |
| 8,326,658 B1* | 12/2012 | Lee et al. | 705/7.11 |
| 2010/0088154 A1* | 4/2010 | Vailaya et al. | 705/10 |
| 2012/0041851 A1* | 2/2012 | Tan | 705/30 |

OTHER PUBLICATIONS

Schafer et al., E-Commerce Recommendation Applications, Data Mining and Knowledge Discovery, 5, 115-153, 2001, Kluwer Academic Publishers, The Netherlands.*
Listing of Copending Cases-Sparc.645A2, May 15, 2012.

* cited by examiner

*Primary Examiner* — Matthew Zimmerman
(74) *Attorney, Agent, or Firm* — Knobbe, Martens, Olson & Bear, LLP

(57) ABSTRACT

A system can compare a newer model of a product to an older model of a product to determine attributes or features that are new to the newer model of the product. The system can then identify other products in the same product category as the newer model of the product that includes the new attribute or product feature. The system can recommend one or more of the products with the new product feature to a potential customer. In some cases, the system may identify an average upgrade time interval for upgrading the product. Then, if the system determines that the upgrade time interval has elapsed since a user obtained the older model of the product, the system can recommend the newer model of the product and/ or other products that include the new product feature to the user.

27 Claims, 7 Drawing Sheets

METHOD, MEDIUM, AND SYSTEM FOR BEHAVIOR-BASED RECOMMENDATIONS OF PRODUCT UPGRADES

BACKGROUND

Various methods are used by retailers (e.g., brick-and-mortar stores and Internet-based stores) in an attempt to sell products. Some retailers attempt to use market-based data to promote products. For example, a retailer may identify or recommend to potential customers products that are best-selling or most popular among other customers. Some retailers may identify products that have received positive praise from third-party sources that may appeal to potential customers (e.g., Consumer Reports®).

In some cases, retailers attempt to appeal to an individual customer by recommending products based on what other customers may have purchased who bought or viewed similar products. However, the retailer often does not know why the other customers selected the product and so such a recommendation may not be effective with some potential customers. In an attempt to personalize the recommendations, some retailers may recommend products based on similarities between the products and previously purchased products of an individual customer.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF SPECIFIC EMBODIMENTS

Introduction

Figure 1:
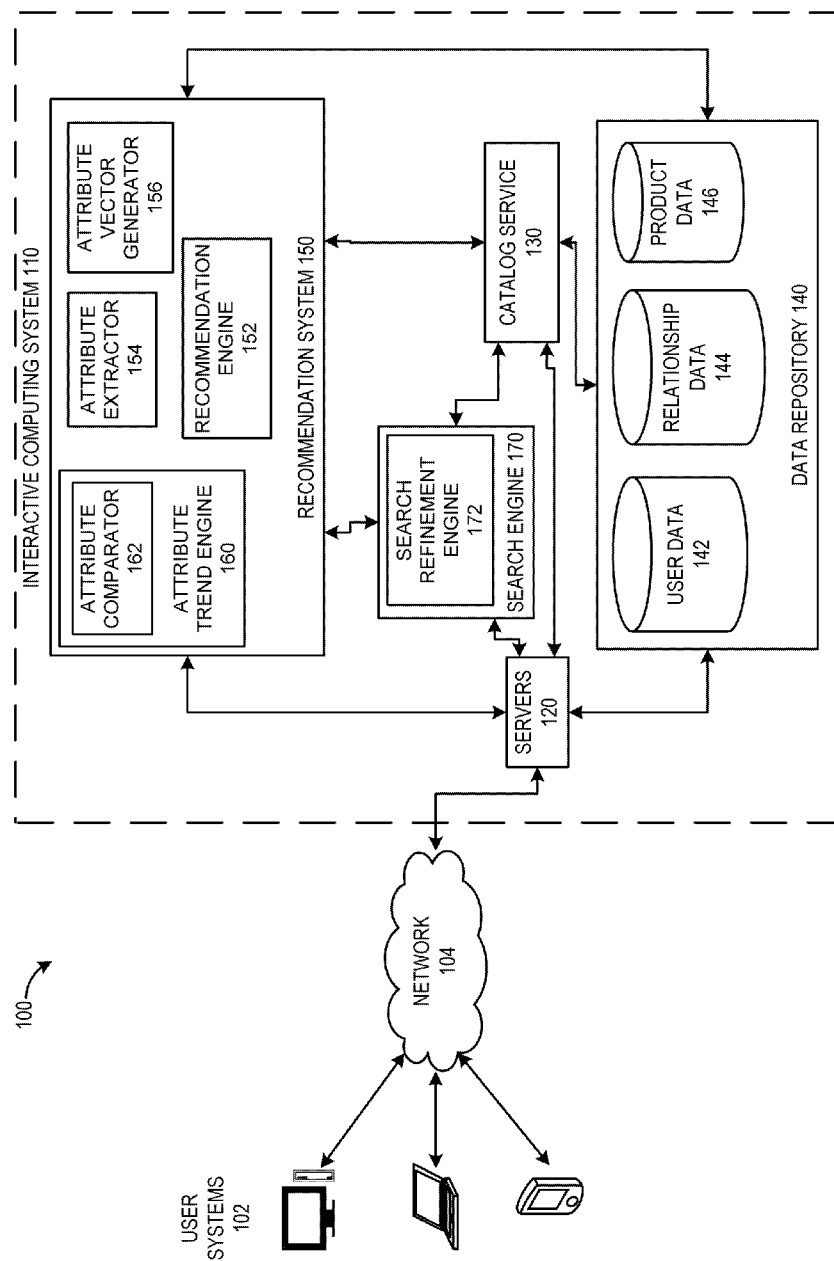
FIG. 1 illustrates an embodiment of a networked computing environment that can implement the features described herein in the context of an example interactive computing system in accordance with some embodiments of the present disclosure.

In many situations, consumers' purchase decisions are driven by the availability of new technologies or product features. This is especially true when a consumer is replacing or upgrading a previously purchased product. For example, a consumer may wish to replace a previously purchased vacuum cleaner based on the availability of bagless vacuum cleaners, especially if bagless vacuum cleaners were not yet available at the time of the previous purchase. As another example, a consumer may wish to replace an existing digital camera based on the recent release of new digital cameras having networking capabilities.

A computer-implemented system and associated processes are described herein for identifying product features or technologies (collectively "features") that were not previously available (or were not generally or widely available) at a particular point in time within a product category. In some cases, the system may also automatically assess whether the new product features are currently driving sales, or are otherwise popular among consumers, within the associated product categories.

The information generated by the system regarding new product features may be used in various ways to assist users in discovering and/or evaluating products in an electronic catalog. As one example, the availability of a new product feature within a particular product category may be used as a basis for recommending products having that feature. Such recommendations may, for example, be targeted to users who purchased a product within the product category prior to the availability of the new feature. As another example, the system may proactively send personalized notifications to users regarding the availability of new product features (e.g., "the <product category identifier> you purchased on <date> did not include the following new feature: <new product feature identifier>; click here to view products that include this new feature.") As another example, the new product features can be highlighted as such on product detail pages of the electronic catalog. Thus, although a number of the processes described herein include recommending a product to a user, in some embodiments, the processes described herein may be used to identify new product features or attributes regardless of whether the new product features or attributes are recommended to a user. In some cases, the identity of new product features may be stored in a database or used for any purpose including, for example, deciding what products to feature on a webpage, what product features to highlight on a product detail page, or what products to order from a product manufacturer.

In some embodiments, the system may identify new attributes or new product features by comparing the attributes of products from an earlier time period (e.g., 1 to 3 years ago) with the attributes of products from a later or more recent time period (e.g., today) for a given product classification. The time periods may be of any duration. For example, each time period may be a year long, or the earlier time period may be a year long and the more recent time period may be within the last 6-months. By identifying attributes that are associated with products from the later time period, but not with products from the earlier time period, the system can identify new product features available for products associated with the given product classification. In some cases, the system may compare the attributes of a subset of products from the different time periods. For example, the system may compare the top-selling or highest rated products from the two time periods.

Although various embodiments described herein generally describe comparing product attributes from two time periods, the present disclosure is not limited as such. Various embodiments of the present disclosure may be used to compare products from any number of time periods to determine attributes or product features that are available during one time period, but may not have been available during another time period. Further, in some cases, embodiments described herein can be used to identify attributes or product features that may have been available during an earlier time period, but are no longer available.

Although the term "new attribute" and "new product feature" are used herein, the disclosure is not limited to identifying attributes or product features that are new to a product or product classification. As used herein, the term "new attribute" can include attributes that have changed to a new state. Similarly, as used herein, the term "new product feature" can include product features that have changed or improved. For example, the reduction in size of a product to a size that has not previously been available can be considered a new attribute. As a second example, the increase in available zoom for a digital camera from "3×" to "10×" can be considered a new attribute or new product feature if digital cameras were not previously capable of "10×" zoom.

In some embodiments, the system can compare a newer model of a product to an older model of a product to determine attributes or features that are new to the newer model of the product. The system can then identify other products in the same product category as the newer model of the product that includes the new attribute or product feature. The system can recommend one or more of the products with the new product feature to a potential customer. In some cases, the system may identify an average upgrade time interval for upgrading the product. Then, if the system determines that the upgrade time interval has elapsed since a user obtained the older model of the product, the system can recommend the newer model of the product and/or other products that include the new product feature to the user.

The system, in some embodiments, may use the choice of search refinements by users searching for products to identify new product trends. These product trends may be associated with attributes or product features that may previously have been available, but are newly of interest to a threshold number or percentage of users. In some cases, the product features may have previously been of interest to users, but, after a period of a level of reduced interest, are of renewed interest to a threshold number or percentage of users. The system may compare search refinements used by users during an earlier time period with search refinements used by users during a later or more recent time period to identify the search refinements that are used substantially more often during the later time period than the earlier time period. Based on this comparison, the system can identify a product feature that is of interest to users during the later time period, but not the earlier time period. The system can then recommend products with the product feature to potential customers and inform the potential customers that the product feature is of interest to a number of users. Further, if the product feature was not available during the earlier time period, the system can identify to potential customers that the product feature is newly available in relation to the earlier time period.

Moreover, in some cases, the system may use the choice of search refinements by users to determine whether particular new product features are driving sales or are otherwise important to users. New product features that are often used as a search refinement may be identified as important to users and can be the basis of product recommendations or may be highlighted on a product-detail page associated with a product that includes the new product feature. In contrast, new product features that are not used very often as a search refinement may be less emphasized by a recommendation system. Further, in some cases, a retailer can provide information to manufacturers about which new product features are driving sales and which new product features appear to have little impact on sales or product interest. The manufacturers can then use this information in deciding whether to maintain or modify future product plans.

In some embodiments, the system may identify new attributes or product features as mentioned above and as described in more detail below. Then, the system can identify which new attributes or product features are of interest or are of most interest to users based on whether the users' choice of search refinements correspond to new product features. The system can then use the new product features that are of interest to a threshold percentage of users as a basis for recommending products that include the new product features. In some cases, the system can use the choice of search refinements as a basis for identifying product features corresponding to the search refinements regardless of whether the product features are new or have been available for a period of time.

Example Networked Computing Environment

FIG. 1 illustrates an embodiment of a networked computing environment 100 that can implement the features described herein in the context of an example interactive computing system 110 in accordance with some embodiments of the present disclosure. The interactive computing system 110 can generally represent a network application, such as a web application or website, for identifying product attributes and features, and for recommending and selling products or items to a user. In some embodiments, the interactive computing system 110 is associated with a network or Internet-based store or retailer. In some cases, the interactive computing system 110 may be associated with an Internet-based store that is affiliated with a brick-and-mortar store or retailer. The network 104 may include any system for allowing multiple computing devices to communicate with each other. For example, the network 104 can be a LAN, a WAN, a cellular network, the Internet, combinations of the same, or the like.

The interactive computing system 110 can include a number of systems that facilitate implementing the processes described herein. In the depicted embodiment, the interactive computing system 110 includes several components that can be implemented in hardware and/or software. For instance, the interactive computing system 110 can include one or more servers 120, which may be implemented in hardware, for receiving and responding to network requests from user systems 102. However, some of the capabilities of the servers 120 may be implemented in software. The one or more servers 120 can include web servers, application servers, database servers, combinations of the same, or the like.

Further, the interactive computing system 110 may include a search engine 170, which may be implemented in hardware and/or software. The search engine 170 can include any system for searching an electronic catalog. For example, the search engine 170 can search an electronic catalog provided by the catalog service 130. Both the search engine 170 and the catalog service 130 may be in communication with the servers 120. Users can browse an electronic catalog provided by the catalog service 130 or query the search engine 170 to obtain information about electronic catalog content stored in a product data repository 146.

The electronic catalog content can include information about items or products, and/or services. In one embodiment, this content is arranged in a hierarchical structure, having products or items associated with one or more categories or browse nodes in a hierarchy. The catalog service 130 can provide functionality for users to browse the product hierarchy in addition to searching the catalog via the search engine 170.

In some cases, the hierarchical structure can include a tree-like structure with browse nodes that are internal nodes and with browse nodes that are leaf nodes. The internal nodes generally include children or descendent nodes and the leaf nodes generally do not include children nodes. The internal nodes may be associated with a product or item category or classification, which can include sub-classifications. The sub-classifications may represent additional internal nodes or leaf nodes. The leaf nodes may be associated with a product or item category or classification that does not include sub-classifications. In some implementations, the internal nodes are associated with product classifications and sub-classifications, but not products, and the leaf nodes are associated with the products. In other implementations, both the internal and leaf nodes may be associated with products.

Users can select an item or product represented in the hierarchy or in a list of search results to see more details about the product. In response to a user's product selection, the server 120 can provide to a user system 102 a catalog page (sometimes called an item or product detail page) that includes details about the selected product.

The search engine 170 can include a search refinement engine 172. The search refinement engine 172 can include any system that can determine one or more attributes associated with a subset of products in a browse node or a product category or classification. In some cases, the attributes may be identified from multiple browse nodes or from a sub-hierarchy of browse nodes within the complete electronic catalog hierarchy. These attributes can serve as potential search refinements. The search refinement engine 172 can cause these potential search refinements to be presented to a user who is searching an electronic catalog for a product associated with the browse node. Upon the user selecting one or more of the search refinements, the search engine 170 can narrow the search results to products in the browse node that are associated with the one more search refinements or corresponding attributes.

For example, if a user searches for a camera, using either a text search or by selecting a link on a webpage that is associated with retrieving a listing of cameras from the electronic catalog, the user may be presented with a webpage that identifies a number of cameras included in the electronic catalog. Further, the user may be presented with a list of search refinements that enable the user to narrow the search. For example, the search refinements may include a set of price ranges, a set of optical zoom ranges, a set of digital zoom ranges, a listing of camera brands, etc. By selecting one or more of the search refinements, the user can narrow the listing of cameras presented to the user.

The interactive computing system 110 can also include a recommendation system 150. The recommendation system 150 can generally include any system for recommending one or more products to a user associated with the user systems 102. The recommendation system 150 may recommend a product in response to a request from a user or from an administrator associated with the interactive computing system 110. In one embodiment, the recommendation system 150 may recommend an item automatically without receiving a user request. In some cases, the recommendation system 150 may recommend a product to a user in response to a passage of time since a previous purchase by the user.

The recommendation system 150 includes a number of components that facilitate the recommendation system 150 providing recommendations to users. Alternatively, one or more of the components may be separate from the recommendation system 150. In the depicted embodiment, the components can include a recommendation engine 152, an attribute extractor 154, an attribute vector generator 156, and an attribute trend engine 160, which may include an attribute comparator 162. In some implementations, the attribute comparator 162 may be separate from the attribute trend engine 160. Recommendation system 150 can be implemented in hardware or software. Further, one or more of the components of recommendation system 150 can be implemented in hardware or software.

In one embodiment, the attribute extractor 154 can include any system that can extract attributes from product-related content associated with a product. These attributes can include any objective or quantifiable information associated with the product. For example, the attributes can include price, color, size, warranty, brand, battery life, noise level, and functions or capabilities. Generally, the capabilities are product specific. For example, capabilities of a camera may include "takes pictures," "zoom 5×," and "uses rechargeable battery." In some cases, attributes may include product features, such as a front-facing camera on a camera-phone. In some cases, attributes may be associated with values. For example, the "zoom" attribute of a camera may be associated with "5×." However, in some instances, attributes may be tags or keywords associated with a product. For example, a camera may include the tag "top of the line" if it includes the latest product features available by the manufacturer of the camera, or by any camera manufacturer. As a second example, the camera may include the keyword or tag "image stabilization" if the camera includes such a product feature.

In certain embodiments, attributes can include concepts. Concepts can include objective and subjective information associated with a product. For example, if a product is a smartphone, the concepts might include "great battery life," "terrible speaker quality," or "zen-styling." Examples of concepts and concept extraction that may be used herein are described in U.S. patent application Ser. No. 13/097,639, filed Apr. 29, 2011, titled "Method and System for Relating Items Based on Concepts," the disclosure of which is hereby incorporated by reference in its entirety.

The product-related content can include any type of professionally-generated content, manufacturer-generated content, retailer-generated content, user-generated content, or free-form text. Further, the product-related content can include both product review content and non-product review content. For example, the product-related content can include: user reviews, professional reviews, manufacturer descriptions, retailer descriptions, tags, user-generated lists (e.g. user top ten lists), crowd-sourced content such as wiki-content (e.g., Wikipedia® entries), and forum posts or entries, to name a few. The product-related content can be created by customers or employees of an organization associated with the interactive computing system 110 or by vendors who submit such content to the interactive computing system 110. In addition, the product-related content may be created by users of the interactive computing system 110. Examples of user interfaces and processes that may be used to collect and process reviews from users are described in U.S. Pat. No. 7,664,669, filed Nov. 17, 2000, titled "Methods and Systems for Distributing Information within a Dynamically Defined Community," the disclosure of which is hereby incorporated by reference in its entirety.

In one embodiment, the attribute extractor 154 extracts attributes by analyzing phrases included in the product-related content. The attributes can be based on the phrases and/or quotes included in the product-related content. Further, the attribute extractor 154 can identify and combine similar or identical attributes that are described differently into a single attribute. For example, the attribute extractor 154 can combine "12-hour battery life," and "half-day battery life" into a single attribute.

Any number of natural language processing techniques can be used for identifying attributes to extract from the product-related content. For example, assuming that the product-related content is a manufacturer's product description, one process can begin by identifying and filtering out stop words included in the customer review. The stop words can include words on a predetermined list of words that are identified as unlikely to facilitate attribute identification. For example, the list of stop words can include articles, prepositions, and linking verbs, to name a few. In some embodiments, the list of stop words may differ based on the product-related content and/or the type of attributes to be extracted.

The example process for identifying attributes can further include shortening each word, or a pre-specified subset of words, to their root form. Further filtering may be performed to remove brand names and marketing terms. Each remaining word can be considered a potential attribute. In some embodiments, pattern matching can be used to identify phrases as attributes. In some cases, attributes my be identified manually by, for example, an employee of an organization associated with the interactive computing system 110.

The attribute vector generator 156 can include any system that can generate an attribute vector from the attributes extracted by the attribute extractor 154. This attribute vector can be associated with the product and stored in the data repository 140. Further, the attribute vector can be used to make comparisons between products. Although described as a vector, the attribute vector can include any representation or data structure capable of associating the attributes with the product. For example, the attribute vector can be an attribute tree or a linked list.

Further, the attribute vector generator 156 can generate an attribute vector associated with a plurality of products. For example, the attribute vector can be associated with digital cameras first made available in the year 2010.

The attribute trend engine 160 can include any system that can identify new attributes and/or new product features based on attributes associated with products. In some embodiments, the attribute trend engine 160 may identify attributes and/or product features that are newly available for products of a product classification. In some cases, newly available attributes or product features can include newly popular attributes and or product features that were previously available, but not frequently purchased or searched for until recently. For example, suppose product feature X was first available on some products in 2009, but because of, for example, the high cost of products with product feature X, few customers (e.g., early adopters) purchased products with product feature X in 2009. Now suppose that the cost for product feature X decreased significantly in 2011 and that a substantially greater number of customers purchased products with product feature X in 2011. Assuming the substantially greater number of customers exceeds a threshold, the attribute trend engine 160, in some embodiments, may identify product feature X in 2011 as a newly popular product feature.

As illustrated in FIG. 1, the attribute trend engine 160 can include an attribute comparator 162. The attribute comparator can include any system that can compare the attributes of one product, or one set of products, with the attributes of another product, or another set of products, to determine a newly available attribute. Generally, the products whose attributes are being compared are associated with the same browse node or product classification. However, in some embodiments, the products may be associated with more than one browse node. For example, some of the products may be associated with a leaf node that is a descendent of a browse node and other products being compared may be associated with another leaf node that is a descendent of the same browse node.

The recommendation engine 152 can determine one or more products to recommend to a user. In one embodiment, these products can be identified based on attributes and/or product features that are newly available. Further, these products may be based on identifying attributes and/or product features that may be associated with newer models of products that may already be owned by a customer or user who is receiving the recommendation.

The data repository system 140 can generally include any repository, database, or information storage system that can store information associated with items and users. This information can include any type of data including: product descriptions, account information, customer reviews, item tags, or the like. Further, this information can include relationships between products, between users, and between products and users.

The data repository 140 can include a user data repository 142, a relationship data repository 144, and an item data repository 146. The user data repository 142 can store any information associated with a user including account information, user purchase information, user demographic data, product view information, user searches, identity of products owned by a user (e.g., purchased or obtained as a gift) or the like. Further, the user data repository 142 can store an attribute vector associated with product selections. These product selections can include one or more products purchased and/or viewed by the user.

The product data repository 146 can store any information associated with a product. For example, the product data repository can store product descriptions, customer reviews, product tags, manufacturer comments, etc. Further, the product data repository 146 can store an attribute vector associated with each of the products in the product data repository 146.

The relationship data repository 144 can store any information that relates one product to another product. For example, the relationship data repository 144 can include information identifying products that were first available in a specific year, products that share a product classification, or products that share a sales ranking (e.g., products on top ten sales list by volume and/or by monetary sales numbers).

The user systems 102 can include any computing system that can communicate with the interactive computing system 110 via the network 104. These computing systems can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, the user systems 102 can include any type of software (such as a web browser) that can facilitate communication with the interactive computing system 110.

Example of an Attribute Vector Generation Process

Figure 2:
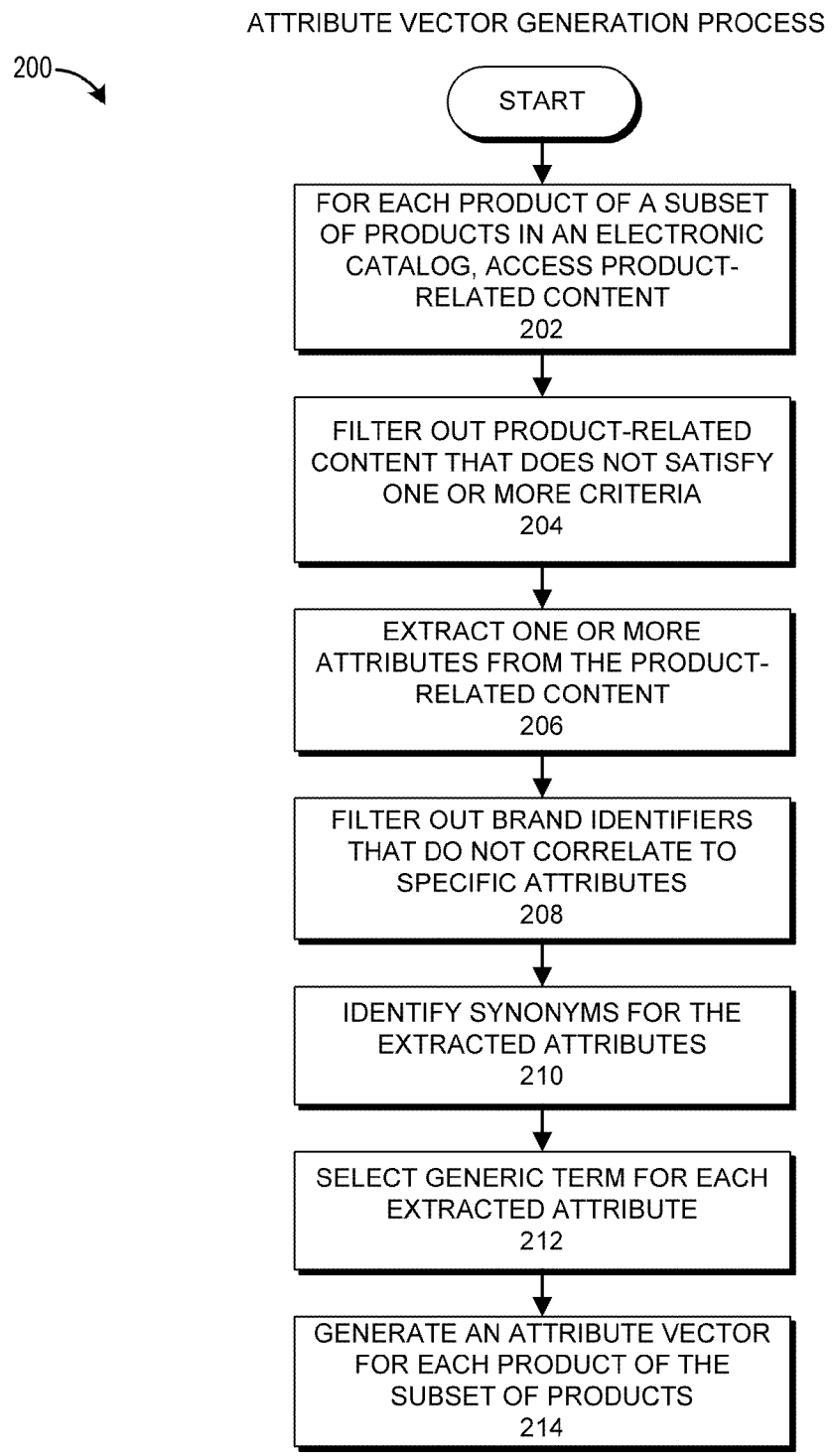
FIG. 2 illustrates a flow diagram for one embodiment of an attribute vector generation process in accordance with some embodiments of the present disclosure.

FIG. 2 illustrates a flow diagram for one embodiment of an attribute vector generation process 200 in accordance with some embodiments of the present disclosure. The process 200 can be implemented by any system that can extract attributes from product-related content to identify a set of attributes associated with a product. For example, the process 200, in whole or in part, can be implemented by the interactive computing system 110, the servers 120, the recommendation system 150, the recommendation engine 152, the attribute extractor 154, the attribute vector generator 156, the attribute trend engine 160, and the attribute comparator 164, to name a few. Although any number of systems, in whole or in part, can implement the process 200, to simplify discussion, the process 200 will be described as being generally implemented by the recommendation system 150.

The process 200 begins at block 202, where, for example, the recommendation system 150, for each product of a subset of products in an electronic catalog, accesses product-related content. The subset of products can include products associated with one or more browse nodes or product categories. For example, the subset of products can include products associated with a browse node or products associated with a browse node and one or more parent or children or sibling nodes. The product-related content may be any type of content that can be associated with the product in the electronic catalog. Further, the product-related content may include content from additional sources. For example, product-related content can include content from Wikipedia®, third-party websites (e.g., product review, industry news, or industry tracking websites), or additional content sources associated with the interactive computing system 110 or an organization associated with the interactive computing system 110.

At block 204, the recommendation system 150 can filter out product-related content that does not satisfy one or more criteria. This criteria can include any criterion including, for example, a relevance classification of the product-related content with respect to the corresponding product, or an origin of the product-related content (e.g., from the product manufacturer, from customers, from employees of an organization associated with the interactive computing system 110). In one embodiment, relevance refers to whether the product-related content relates to the item or is off-topic, such as a forum post by a malicious user attempting to redirect users to third-party websites, or a customer review that only discusses corporate policies or insults a previous reviewer without providing any information that relates to the item. In some cases, at least some of the criteria may be predetermined and in other cases the criteria may not be predetermined.

At block 206, the recommendation system 150 using, for example, the attribute extractor 154 extracts one or more attributes from the product-related content. These attributes can be predefined, such as by an administrator associated with the interactive computing system 110. Alternatively, the attributes emerge based on analysis of an initial set of products by the attribute extractor 154. For example, if product-related content associated with a set of cameras each contain the phrase "image stabilization," the attribute extractor 154 may determine that "image stabilization" is an attribute associated with some cameras. In some cases, at least some of the attributes can be determined by analyzing, testing, or using the product. The analysis of the product may be performed by a user, who may or may not be associated with the interactive computing system 110, or may be performed, at least in part, by one or more computing systems. For example, a manual or automated test system may be used to test the battery life of different cameras under different usage profiles to determine a battery life attribute for the cameras.

At block 208, the recommendation system 150 using, for example, the attribute extractor 154 filters out brand identifiers that do not correlate to specific attributes. Brand identifiers can include a manufacturer's name as well as specific brands promoted by a product manufacturer or other product provider. For example, if the product is a Sony VAIO® computer, the attribute extractor 154 can filter out both "Sony" and "VAIO" as neither are associated with a specific attribute of a computer, such as its screen size or processor speed.

At block 210, the recommendation system 150 using, for example, the attribute extractor 154, identifies synonyms for attributes and/or product features. These synonyms may be identified using any source of alternative attribute terms. For example, to determine synonyms, the attribute extractor 154 may access a dictionary, including general dictionaries, technology specific dictionaries, and manufacturer specific dictionaries generated by a manufacturer or by an organization associated with the interactive computing system 110. As additional examples, of sources for identifying synonyms, the attribute extractor 154 may use a thesaurus, a manufacturer provided synonym list, or a synonym list created by an organization associated with the interactive computing system 110.

In some cases, certain brand identifiers may be associated with a specific attribute of a product. In other words, some organizations may use a brand-specific term to identify an attribute or product feature associated with a product or product line. Other organizations may offer products with the same or similar attribute, but may use their own brand-specific term or a generic term to identify the attribute. In such cases, the brand-specific term is not filtered out at block 208. Instead, as part of the process associated with the block 210, generic terms associated with the attribute corresponding with the brand-specific term are identified. For example, if camera manufacturer X uses the brand-specific phrase "Vibration Controlz" for an image stabilization attribute of its cameras, the attribute extractor 154 at block 210 may extract and/or associate the attribute of image stabilization with cameras from manufacturer X that include "Vibration Controlz" as part of their product-related content (e.g., manufacturer's description).

Further, the attribute extractor 154 may use surrounding terms to determine the attribute or a synonym for the attribute associated with a term. For example, suppose that camera manufacturer Y uses the term "SteadyPic" to indicate that its cameras have image stabilization. In some cases, "SteadyPic" may not be in a dictionary of recognized terms, such as if the manufacturer adopted the term recently. The attribute extractor 154 may use surrounding terms to determine that "SteadyPic" is manufacturer Y's new term for image stabilization. For example, if the product description states that "SteadyPic will counter shaking of the camera during a shot," the attribute extractor 154 may determine based on the phrases "counter shaking" and "during a shot" that "SteadyPic" refers to image stabilization. "SteadyPic" can then be added to a list of manufacturer specific terms used to identify image stabilization. In some embodiments, administrator feedback is required before adding the term to the list. Advantageously, in certain embodiments, the ability of the attribute extractor 154 to examine surrounding terms and phrases to determine the meaning of a term or phrase enables the attribute extractor 154 to determine synonyms for more complex phrases or terms compared to synonym analysis that considers each term independently. Generally, embodiments of the attribute extractor 154 can use any date mining or machine learning techniques to identify attributes associated with a product based on product-related content.

At block 212, the recommendation system 150 using, for example, the attribute extractor 154, selects a generic term for each extracted attribute. In some cases, block 212 includes replacing brand-specific attribute, or product feature, identifiers with non-brand specific terms. For example, the attribute extractor 154 may replace "SteadyPic" with "image stabilization." Further, block 212 may include replacing one generic term with another to maintain a consistent use of terms across products in a product classification to describe an attribute. For example, the generic phrase "vibration control" may be replaced with "image stabilization."

At block 214, the recommendation system 150 using, for example, the attribute vector generator 156 generates an attribute vector for each product of the subset of products. The attribute vector includes the extracted attributes, and in some cases product features, are associated with the product. These extracted attributes included in the attribute vector may include the attributes that remain after the filtering process of block 208. Further, the attributes may be synonyms of the extracted attributes identified during the process of block 210. Moreover, the attribute vector may include the generic terms for the attributes determined at block 212. In some implementations, block 214 includes associating the extracted attributes for each product with the product regardless of the form of associated. In other words, the extracted attributes may be part of a vector associated with the item, or may be associated with the product in any manner (e.g., in a list, database record, matrix, etc.). The recommendation system 150 may store the attribute vectors in the product data repository 146.

In some cases, attributes may be temporal. For example, a product may be associated with a "cutting edge" attribute if it includes the latest available product features for the product category. However, in six-months, the product may no longer include the latest available product features due to the development of newer product features. Thus, the attribute of "cutting edge" may be disassociated with the product. As a second example, a product may include the attribute "Made in the USA" or "locally produced" if it is manufactured in the United States of America. However, if the manufacturer moves production to another country, the attribute vector associated with the product may be modified to reflect the location of the product's manufacture.

In some embodiments, some of the processes described above with reference to the process 200 may be optional, or performed in a different order. For example, in some cases, block 210 may be performed before block 208. Further, in some cases, blocks 204, 209, 210, and/or 212 may be optional.

Example of a New Feature Recommendation Process

Figure 3:
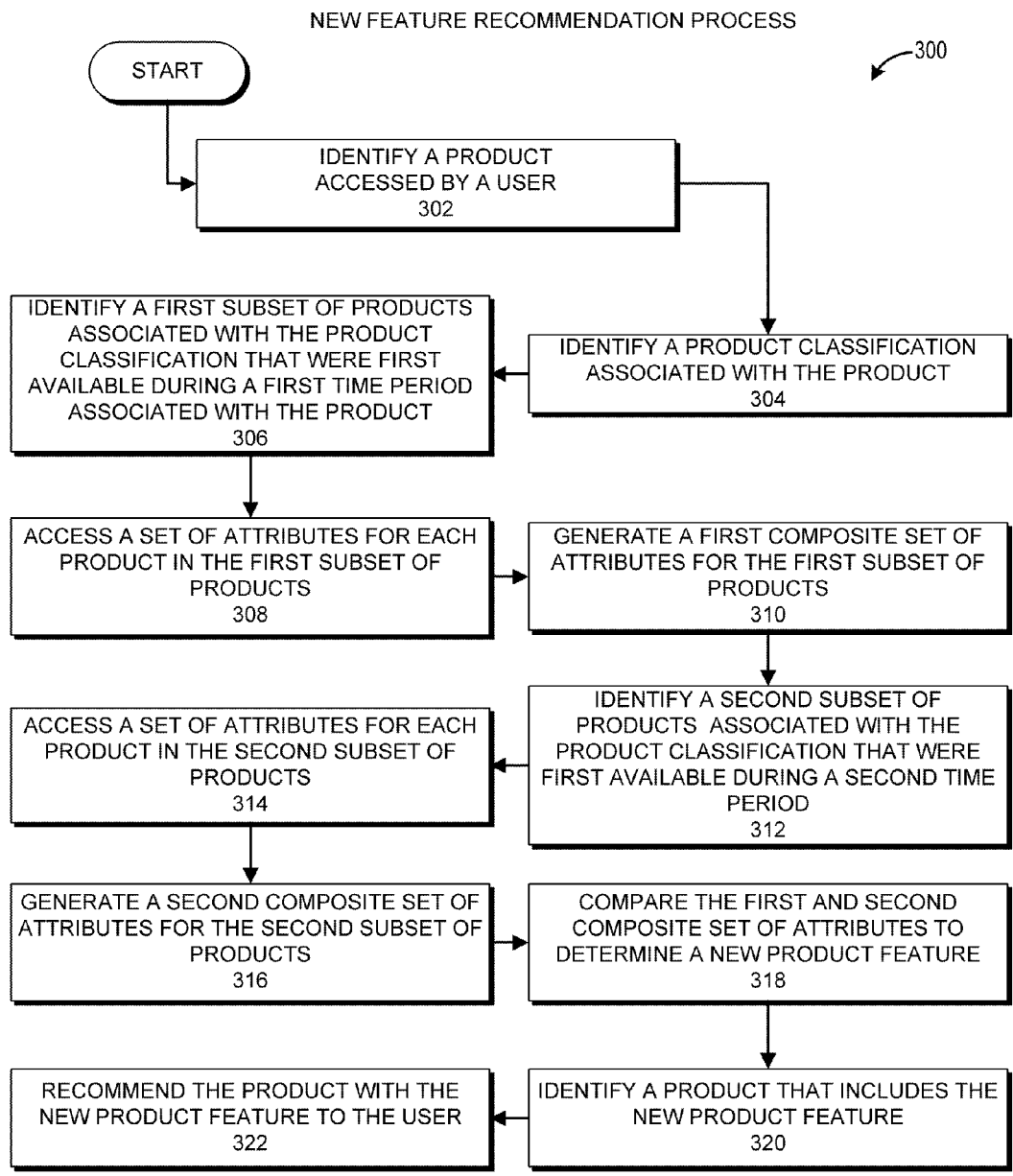
FIG. 3 illustrates a flow diagram for one embodiment of a new feature recommendation process in accordance with some embodiments of the present disclosure.

FIG. 3 illustrates a flow diagram for one embodiment of a new feature recommendation process 300 in accordance with some embodiments of the present disclosure. The process 300 can be implemented by any system that can identify a product to recommend based on the determination that the product includes an attribute and/or product feature that was not previously available. For example, the process 300, in whole or in part, can be implemented by the interactive computing system 110, the servers 120, the recommendation system 150, the recommendation engine 152, the attribute extractor 154, the attribute vector generator 156, the attribute trend engine 160, and the attribute comparator 164, to name a few. Although any number of systems, in whole or in part, can implement the process 300, to simplify discussion, the process 300 will be described as being generally implemented by the recommendation system 150.

The process 300 begins at block 302, where, for example, the recommendation system 150 identifies a product accessed by a user. Identifying a product accessed by the user can include identifying a product purchased or received as a gift by the user, or identifying a product included, for example, in an electronic catalog that is viewed or selected by the user. Viewing the product can include viewing a product-detail page associated with the product. Further, selecting the product can include adding the product to an online shopping cart. Moreover, identifying the product may involve accessing a purchase or gift history associated with the user from the user data repository 142. Generally, the product identified at the block 302 was accessed by the user during a historical time period or an earlier time period than a current time period. For example, assuming it is currently the year 2012, the product that is identified at the block 302 may be a product purchased by the user in the year 2006. In some embodiments, the product can include a product accessed at any time by the user including a current time period.

At block 304, the recommendation system 150 can identify a product classification associated with the product. This product classification may be the browse node that includes the product. In some cases, the product classification may be a browse node that is a parent of the browse node that includes the product. For example, if the product is a digital camera, the browse node used to identify the product classification may be "camera," which can include descendant or leaf browse nodes corresponding to digital cameras, video cameras, SLR cameras, and 35 mm film cameras.

At block 306, the recommendation system 150 identifies a first subset of products associated with the product classification that were first available during a first time period. In certain embodiments, products that were first available may include products that were first available for sale by an organization associated with the interactive computing system 110. Alternatively, or in addition, products that were first available may include products that were first available for sale by any organization. In some cases, products that were first available may include products that were announced to users or made available for pre-sale, but that may not yet be released by the manufacturer of the products.

Although not limited as such, the first time period generally includes a time range associated with the user accessing the product. Thus, in certain embodiments, the first time period can include any time period that begins with, ends with, or includes the point in time when the user accessed the product. Alternatively, the first time period may include any time period that begins with, ends with, or includes the point in time when the product was first available, which may or may not include the point in time when the user accessed the product. For example, if the user purchased the product in June of 2006, the first time period may include the entire year 2006. As a second example, again assuming the user purchased the product in June 2006, if the product was first available in 2004, the first time period may include the year 2004, or the years 2004 and 2005.

In some implementations, the first subset of products are associated with a best-selling list or any other type of product ranking. For example, the first subset of products may include the ten best-selling products by, for example, volume during the first time period. In some cases, the first subset of products includes all the products associated with the product classification that were first available during the first time period.

In some embodiments, the first subset of products does not include the product accessed by the user. In other embodiments, the first subset of products does include the product accessed by the user. In some cases, the first subset of products may be limited to the product accessed by the user.

At block 308, the recommendation system 150 accesses a set of attributes for each product in the first subset of products. In some implementations, accessing the set of attributes includes accessing an attribute vector for each product in the first subset of products. In some cases, the recommendation system 150 may access the attributes or attribute vector associated with each product in the first subset of products from, for example, the product data repository 146.

At block 310, the recommendation system 150 using, for example, the attribute vector generator 156 generates a first composite set of attributes. In some implementations, generating the first composite set of attributes includes generating an attribute vector for the first subset of products. The first composite attribute vector may include each attribute that is associated with at least one of the first subset of products. Alternatively, the first composite attribute vector may include only attributes that are associated with a threshold number of products from the first subset of products. As another alternative, each attribute in the first composite attribute vector may be weighted. In some cases, the attribute may be weighted based on the number of products from the first subset of products that include the attribute. Alternatively, or in addition, the attribute may be weighted based on the type of attribute. For example, attributes that relate to physical qualities of the product (e.g., size or color) may be weighted lower than attributes that relate to capabilities of the product (e.g., ability to recharge batteries or ability to project three-dimensional pictures or video). Attributes below a threshold weight may be filtered out from the first composite vector resulting in a first composite vector that includes attributes that satisfy the threshold weight, but not those that do not satisfy the threshold weight.

At block 312, the recommendation system 150 identifies a second subset of products associated with the product classification that were first available within a second time period. Usually, the second time period will include some time period that is later, or more recent, than the first time period associated with the block 306. For example, the second time period may be the year 2011 while, as stated above, the first time period associated with the availability of the first subset of products may be the year 2006. The second time period may include a current time or date. In some embodiments, the second time period may include a future time period. Advantageously, in certain embodiments, including a future time period enables the recommendation system 150 to include announced, but not yet released products in the second subset of products. In some embodiments, the second subset of products may include any products that were first available after the first time period. Thus, again using the year 2006 as an example of the first time period, the second subset of products could include any products that were first available after 2006.

In some implementations, the second subset of products includes products associated with a best-selling list or any other type of product ranking. For example, the second subset of products may include the ten most popular products as measured by the number of views by customers of product-detail pages associated with the products during the second time period. In some cases, the second subset of products includes all the products associated with the product classification that were first available during the second time period.

At block 314, the recommendation system 150 accesses a set of attributes for each product in the second subset of products. In some embodiments, accessing the set of attributes includes accessing an attribute vector for each product in the second subset of products. In some cases, the recommendation system 150 may access the attributes or attribute vector associated with each product in the second subset of products from, for example, the product data repository 146.

At block 316, the recommendation system 150 using, for example, the attribute vector generator 156 generates a second composite set of attributes. In some implementations, generating the second composite set of attributes includes generating an attribute vector for the second subset of products. The second composite attribute vector may include each attribute that is associated with at least one of the second subset of products. Alternatively, the second composite attribute vector may include only attributes that are associated with a threshold number of products from the second subset of products. As another alternative, each attribute in the second composite attribute vector may be weighted. In some embodiments, some or all of the embodiments described with respect to weighting at block 310 may apply to block 316. Attributes below a threshold weight may be filtered out from the second composite vector resulting in a second composite vector that includes attributes that satisfy the threshold weight, but not attributes that do not satisfy the threshold weight. The threshold weight for creating the second composite vector may or may not be the same threshold weight used for creating the first composite vector.

At block 318, the recommendation system 150 using, for example, the attribute comparator 162 compares the first and second composite set of attributes to determine a new product feature and/or a new attribute. Comparing the composite sets of attributes may include comparing the first and second set of composite vectors. The new product feature may be identified by determining one or more attributes that are included in the second composite set of attributes, but not the first composite set of attributes. Alternatively, or in addition, the new product feature may be identified by determining one or more attributes that are included in the second composite set of attributes with different values than in the first composite set of attributes. These values may be numeric (e.g., number of megapixels for a set of digital cameras) or non-numeric (e.g., the type of filter used on a vacuum). Product features associated with the one or more attributes can then be identified as new product features, or new attributes. These new product features generally include product features that are available in at least some products of the second subset of products, but not in products from the first subset of products. In some cases, the new product features may exist in at least some products of the first subset of products, but in a lower percentage or number of products from the first subset of products than in the second subset of products. In other words, in some embodiments, the new product features may include product features that are not completely new, but may be newly in demand or newly popular compared to the popularity of the product features during the first time period.

Advantageously, in certain embodiments, by using a threshold weight at block 310 and/or block 316, the process 300 can be used to identify and filter out attributes and/or product features that may have been available during the first time period, but may not have been widely available. In other words, the process 300 can be used to identify an attribute or product feature that was available on a small percentage of products or only available on less than a threshold number of products. In some embodiments, the filtering may occur as part of the block 318. In such embodiments, an attribute included in the first composite set of attributed that is weighted at least a threshold level less than the attribute is weighted in the second composite set of attributes may be filtered out of the first composite set. Then, when the recommendation system 150 compares the first and second composite sets, the attribute will be identified as associated with a new product feature. Thus, product features which are not newly available, but were not as common during the first time period as the second time period may be identified.

In some embodiments, the process 300 can include filtering one or more of the sets of attributes associated with the first and/or second subset of products and the first and/or second composite sets of attributes to remove attributes that are not associated with product features or have less than a threshold probability of being associated with a product feature. For example, attributes relating to price, color, brand, or shape may be filtered out as such attributes may, in some cases, not distinguish product features. In some cases, these example attributes may distinguish product features and/or may be useful for generating a recommendation. For example, a price drop over time or a newly released color for a product may be appealing to potential customers and may be promoted as a new attribute to potential customers. Thus, in certain instances, the sets of attributes are not filtered or may not filter out some attributes that are not associated with product features.

At block 320, the recommendation system 150 using, for example, the recommendation engine 152 identifies a product that includes the new product feature. The product with the new product feature may be one of the second subset of products. Alternatively, or in addition, the product with the new product feature may be a product associated with the product classification that includes the new product feature, but may or may not be one of the products from the second subset of products.

At block 322, the recommendation system 150 using, for example, the recommendation engine 152 recommends the product with the new product feature to the user. This recommendation may be based on the new attribute and/or new feature identified at block 320. In some embodiments, recommending the product to the user can include informing the user that the product is being recommended because it includes the new attribute and/or the new product feature. Alternatively, the product may be recommended without indicating that it includes the new attribute or product feature. In some instances, recommending the product to the user can include informing the user that the product is being recommended because it includes a product feature that, although may not be newly available, is more in demand or more common than when the user obtained the product associated with the block 302.

In addition, a recommendation of a product with the new product feature can include any additional information that may be of use to a user or that may help generate a sale of the product. For example, additional information that can be provided as part of the information can include informing a user of one or more of the following: an approximate date of when the product feature first became available on products associated with the product classification; a product obtained by the user does not include the new product feature; the new product feature was not available prior to the user obtaining the product; the new product feature is driving product upgrade purchases or other purchases; and the typical or average upgrade interval for products associated with the product classification. Further, the recommendation system 150 can calculate the approximate percentage of users who have upgraded to a product having the new product feature and can provide this information as part of the recommendation for the product with the new product feature (e.g., "12% of customers who purchased a vacuum cleaner before 2009 have upgraded to a bagless vacuum cleaner").

In some embodiments, the block 322 may be optional. Further, in some cases, some or all of the information described above with respect to the block 322 can be presented to a user as part of the information presented on a product-detail page associated with a product. This information may be presented on the product-detail page for informational purposes and/or as part of a recommendation. Further, in some embodiments, at least some of the information described above with respect to the block 322 may be used to assist manufacturers in planning future product lines and/or to assist retailers in determining products to stock.

Recommending the product with the new product feature to the user can include using any method or system for providing a recommendation to a user. For example, recommending the product can include sending the user an email, a text message, an instant message, or a message on a social network (e.g., a Facebook® post). Further, recommending the product can include posting a message on the user's account with an organization associated with the interactive computing system 110. Posting the message can include displaying the message in a pop-up window or on a webpage.

In some embodiments, the recommendation system 150 recommends the product with the new product feature if a threshold time period has elapsed since the user obtained (e.g., by purchasing or receiving as a gift) the product associated with the block 302 (the older product). This threshold time period may differ based on the older product. For example, if the older product is of a type that users on average replace every year, the recommendation system 150 may recommend the product with the new product feature after one year has elapsed since the user obtained the older product. If instead users replace the older product once every decade on average, the recommendation system 150 may recommend the product with the new product feature after a decade has elapsed since the user obtained the older product. In some cases, the recommendation system 150 recommends the product with the new product feature up until a threshold time period elapses. For example, the recommendation system 150 may provide recommendations for the first thirty days after the user purchases the older product thereby giving the user the opportunity to exchange the older product with a newer product during a product-return or exchange window permitted by an organization associated with the interactive computing environment 110.

In some embodiments, some operations associated with the process 300 may be performed on a regular or semi-regular basis, while other operations may be performed on a different schedule. For example, the blocks 308, 310, 312, 314, 316, 318, and 320 may be performed once a day to identify new product features or new technology trends for a product classification over two time periods. Continuing this example, the blocks 302, 304, 306, and 322 may be performed in response to the threshold period of time associated with the older product having elapsed, which may be for example, after a year. Thus, in some cases, at least some of the blocks may be performed prior to a time when a recommendation is generated for a user. Further, in some cases, the process 300 may be used identify product features that are new to a current time period, or a more recent time period. These product features may be identified at any time or on a continual basis. At some point in time after the newer product features are identified, the recommendation system 150 may identify one or more users who have purchased a product from the older time period and recommend or identify to the one or more users the products that include the newer product features.

In some embodiments, the process 300 can be used to identify product features or attributes that were available during an earlier time period, but are no longer available. Advantageously, some embodiments of the present disclosure can be used to recommend products to users based on the removal of product attributes. For example, if a number of cameras during an earlier time period include a flash that uses SuperFlashZZ technology, but it is later discovered that SuperFlashZZ technology can cause blindness during a period of prolonged exposure, the process 300 may be used to identify cameras from a later time period that include the new product feature of not including SuperFlashZZ technology. The recommendation system 150 can then recommend a camera to a user based on the camera not including SuperFlashZZ technology.

Example of a Product Upgrade Recommendation Process

Figure 4:
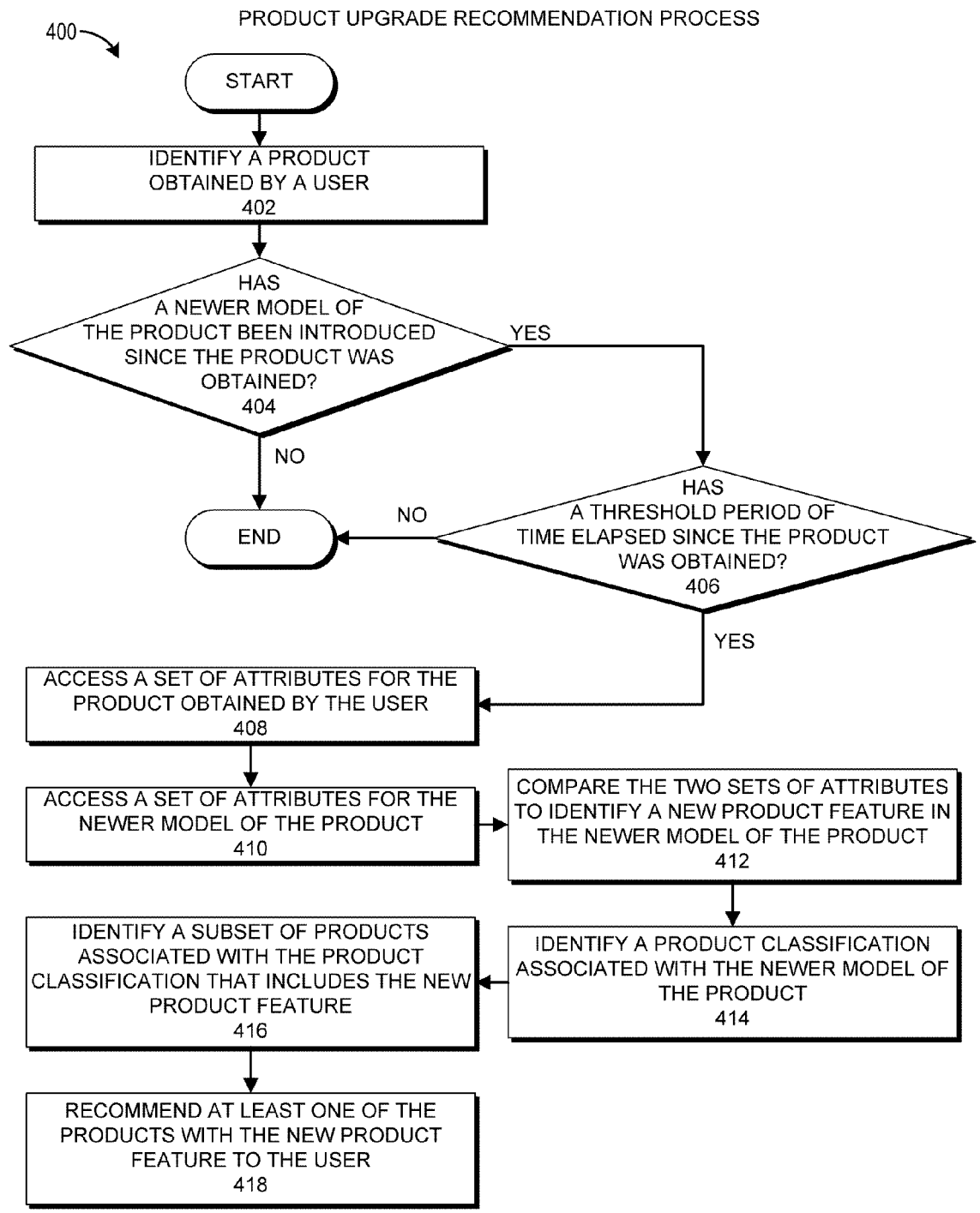
FIG. 4 illustrates a flow diagram for one embodiment of a product upgrade recommendation process in accordance with some embodiments of the present disclosure.

FIG. 4 illustrates a flow diagram for one embodiment of a product upgrade recommendation process 400 in accordance with some embodiments of the present disclosure. The process 400 can be implemented by any system that can identify a product to recommend based on the determination that the product includes a new attribute and/or product feature that is included in a newer model of a product previously obtained by a user. For example, the process 400, in whole or in part, can be implemented by the interactive computing system 110, the servers 120, the recommendation system 150, the recommendation engine 152, the attribute extractor 154, the attribute vector generator 156, the attribute trend engine 160, and the attribute comparator 164, to name a few. Although any number of systems, in whole or in part, can implement the process 400, to simplify discussion, the process 400 will be described as being generally implemented by the recommendation system 150.

The process 400 begins at block 402, where, for example, the recommendation system 150 identifies a product obtained by a user. Identifying a product obtained by the user can include identifying a product purchased or received as a gift by the user. Further, identifying the product may involve accessing a purchase or gift history associated with the user from the user data repository 142. In some cases, the recommendation system 150 may enable users to identify products they own, such as by presenting users with an "I own it" control when the users are viewing the product in the electronic catalog. Advantageously, by enabling users to specify products the users own, embodiments of the processes described herein can be used with products obtained from a source other than an organization associated with the interactive computing system 110.

At decision block 404, the recommendation system 150 may determine whether a newer model of the product has been introduced, or made available, since the product was obtained. Advantageously, in some embodiments, by determining whether the newer model was introduced since the product was obtained, the process 400 ignores newer models that existed, but which the user may have actively decided not to purchase (e.g. due to expense or poor reviews). In some embodiments, the recommendation system 150 may determine whether a newer model of the product has been introduced, or made available, since the product was first made available regardless of when the user obtained the product.

Determining whether a newer model of the product has been introduced by a manufacturer may include comparing model names, model attributes, and model features. In some cases, the newer model may be identified by the manufacturer. Further, the newer model may be identified based on customer reviews. For example, if a number of customer reviews identify model Y as being much improved over model X, model Y may be identified as a newer model of model X regardless of whether the manufacturer identified model Y as an upgrade of model X.

In some instances, a manufacturer may release multiple models during a single product generation that may be considered newer models of the product. For example, the manufacturer may release one model that includes one new product feature and may release another model that includes a different new product feature. As another example, the manufacturer may release one new model with one new feature and another new model with the new feature and a second new feature. When a manufacturer releases multiple products that can be considered a new model of the product obtained by the user, the process 400 can be repeated for each new model. Alternatively, the recommendation system 150 may select the new model that is selling at a higher price or has more customers and perform the process 400 with the selected model.

In some embodiments, determining if a newer model of the product exists includes determining if the newer model is an upgrade along the same product line as the product as opposed to a newer model of a divergent product line. For example, although camera model 20S may be newer than camera model 10A, it is possible that camera model 20S is not an upgrade of the 10A camera model, but is instead an upgrade of the 10S camera model, all of which may be from the same manufacturer. In this example, the "S" line of camera models may be the camera models that use rechargeable batteries or that are SLR cameras, and the "A" line of camera models may be the camera models that use disposable batteries or that are non-SLR cameras.

The newer model of the product may be the newest model or from the newest generation of products from the product line that includes the product obtained by the user. However, in some embodiments, the newer model may not be from the newest generation of products, but may be from an intermediate generation of products that is newer than the product obtained by the user, but not necessarily the latest generation.

If a newer model has not been introduced since the product was made available and/or obtained, the process 400 ends and/or is repeated at a later time. If the recommendation system 150 determines at decision block 404 that a newer model of the product has been introduced, the recommendation system 150 determines whether a threshold period of time has elapsed since the product was obtained by the user at decision block 406. The threshold period of time may be based on an upgrade purchase interval associated with the product. This upgrade purchase interval may be determined based on a statistical amount of time users wait to replace the product. For example, the threshold period of time may be based on the length of time that the average user waits to upgrade the product or an amount of time that a percentage of users (e.g., 35%, 50%, or 60%) wait to replace the product. Further, the upgrade purchase interval may be based on an automated analysis of a frequency with which users make a repeat purchase of one or more products associated with the product classification of the product obtained by the user. The repeat purchase may be a purchase of the same product, another product in the product category, or an upgraded product in the product category. In some cases, the upgrade purchase interval may be based on an expiration of the product or a mean time to failure of the product.

In some cases, the threshold period of time may be determined based on a purchase history of a user. For example, if the user replaces a product from a product classification every two years on average, the threshold period of time may be set to two years. Alternatively, the threshold period of time may be set to some time period prior to two years (e.g., 1 year and ten months) so that the user is informed of a newer model of the product or an alternative product prior to the probable purchase date of the user's next repeat purchase.

In certain embodiments, the threshold period of time may differ based on the user. For example, a user who has been identified as an "early adopter" or who tends to purchase products and/or newer models of products within a period of time after the product is first available, may be associated with a shorter threshold period of time than a user who is not identified as an "early adopter."

If the threshold period of time has not elapsed since the product was obtained, the process 400 ends and/or is repeated at a later time. Advantageously, in certain embodiments, checking whether the threshold period of time has elapsed since the product was obtained reduces or prevents the recommendation system 150 from recommending a newer model of a product to a user who may have purposefully selected the older product (e.g., due to price). Further, in some cases, waiting the threshold period of time before continuing the process 400 reduces the probability of upsetting a customer, which can lead to lost sales.

If the recommendation system 150 determines at decision block 406 that the threshold period of item has elapsed, at block 408 the recommendation system 150 may access a set of attributes for the product obtained by the user from, for example, the product data repository 146. At block 410, the recommendation system 150 may access a set of attributes for the newer model of the product from, for example, the product data repository 146.

At block 412, the recommendation system 150 using, for example, the attribute trend engine 160 or the attribute comparator 162 compares the two sets of attributes to identity a new product feature associated with, or included by, the newer model of the product. In some embodiments, the new product feature is new to the product line that includes the product and the newer model of the product, but may or may not be a new product feature for products associated with the product classification of the product obtained by the user or for other types of products associated with other product classifications. In some cases, the product feature may be new, but the attribute may exist for other types of products. For example, suppose that the new product feature is 3D capability and the product obtained by the user is a digital camera. Although 3D capability may be new to the product line that includes the product obtained by the user, it is possible that other digital camera manufacturers may have previously included 3D capability with their digital cameras. Further, whether or not the newer model of the digital camera is the first to introduce 3D capability, it is possible that other products (e.g., televisions) included 3D capability prior to the camera including the capability. In some embodiments, some or all of the embodiments described above with respect to the block 318 may apply to the block 412.

At block 414, the recommendation system 150 identifies a product classification associated with the newer model of the product. Generally, the product classification for the newer model of the product is the same as the product classification of the product obtained by the user. However, in some cases, the product classification may differ. For example, if the product obtained by the user is a feature phone or "dumpphone," in some cases, a manufacturer may designate a smartphone as the newer model of the feature phone instead of as a new line of products. In the above example, it is possible that the feature phone is associated with a cell phone browse node or product classification, and the smartphone may be associated with a child browse node or product classification for smartphones. Alternatively, the feature phone and the smartphone may each be associated with sibling browse nodes that are both children of a cell phone browse node.

At block 416, the recommendation system 150 using, for example, the recommendation engine 152 identifies a subset of products associated with the product classification that includes the new product feature. At least some of the subset of products may or may not be from the same manufacturer as the newer model of the product. Further, at least some of the products may not have been available when the user obtained the product. In some cases, some of the products were available when the user obtained the product. At block 418, the recommendation system 150 using, for example, the recommendation engine 152 recommends at least one of the products with the new product feature to the user. In some embodiments, recommending the product with the new product feature to the user can include informing the user of an upgrade purchase interval associated with the product and/or the product category. In addition, or alternatively, recommending the product with the new product feature can include informing the user that the upgrade purchase interval associated with the product obtained by the user has elapsed. Further, recommending the product with the new product feature can include informing the user of the product feature. In some cases, recommending the product with the new product feature can include informing the user that the product is comparable to or is produced by a competing manufacturer of the newer model of the product. In some embodiments, some or all of the embodiments described above with respect to the block 322 may apply to the block 418.

In some embodiments, assuming multiple newer models of the product exist, the blocks 408-418 may be repeated for each newer model of the product obtained by the user.

In some embodiments, the process 400 may be used to provide recommendations to users who are viewing products. For example, the block 402 may be modified to identify a product that a user is viewing or to identify a product whose product-detail page the user is viewing. Further, the block 406 may be optional in an embodiment where the process 400 is used to provide recommendations to users who are viewing products. Recommending the product with the new product feature to the user can include displaying a chart or table on the product-detail page of the product the user is viewing. This chart can include information associated with the product that includes the new product feature. Further, the chart can include comparisons between various products that include the new product feature and/or comparisons between a product with the new product feature and the product that the user is viewing.

In some embodiments, the process 400 may be used to identify a product that is a newer model of a product, or an upgrade of the product, as well as additional products that may share one or more features (e.g., new product features) with the newer model of the product. The recommendation system 150 can then identify users who have purchased the product and provide them with recommendations of the newer model of the product and/or the additional products that may share product features with the newer model of the product. In some embodiments, the recommendation system may use the upgrade purchase interval described above to determine when to recommend a newer product.

In some embodiments, the product may be a service and the process 400 can involve identifying a service offering that may include newer or upgraded service features. For example, suppose the originally obtained service is a spa treatment offered by a spa. The spa may begin offering a premium version of the spa treatment. The process 400 can be used to recommend services offered by competing spas that may offer the new premium spa treatment, which in some cases may not have been offered when the user first began purchasing spa treatments.

In some embodiments, the process 300 and the process 400 can be used to identify early adopters. Early adopters can include users who tend to purchase products within a threshold period of time, which may differ per product, after the products are first made available for sale. In embodiments where the process 300 or the process 400 is used to identify early adopters, the recommendation system 150, for example, can monitor a conversion rate for users who receive recommendations of products with new product features. The conversion rate can be correlated with the release dates of the products with the new product features to determine which users are potential early adopters.

Identifying a user as an early adopter can be one factor in determining whether to recommend a new product to the user. Further, the recommendation system 150 can inform the user receiving the recommendation that a product is being recommended because it has been made available within a threshold time period or because it includes a new product feature that was not previously available.

In some embodiments, the recommendation system 150 may determine whether the product category associated with the product obtained by the user at block 402 includes a second product that has a product feature that was not available when the user obtained the first product. The recommendation system 150 may make this determination by comparing the product attributes of the product obtained by the user and the product attributes of products associated with the product category that were first made available after the user obtained the product or after the product was first available.

In some cases, the process 400 can be performed based on any product that a user has identified or accessed at block 402 whether or not the user purchased or obtained the product. For example, if a user views a product detail page associated with a product, the process 400 can be performed using the product that the user viewed. As a second example, a user can specifically identify a product to user for performing the process 400. For instance, the user can navigate to a product detail page for a product and then click a button on the product-detail page to cause the process 400 to be performed. In such a case, the threshold period of time may be set to zero, the user may specify the threshold period of time, or the threshold period of time may be determined based on any of the previously described embodiments.

Example of a Search Refinement Based Product-Trend Identification Process

Figure 5:
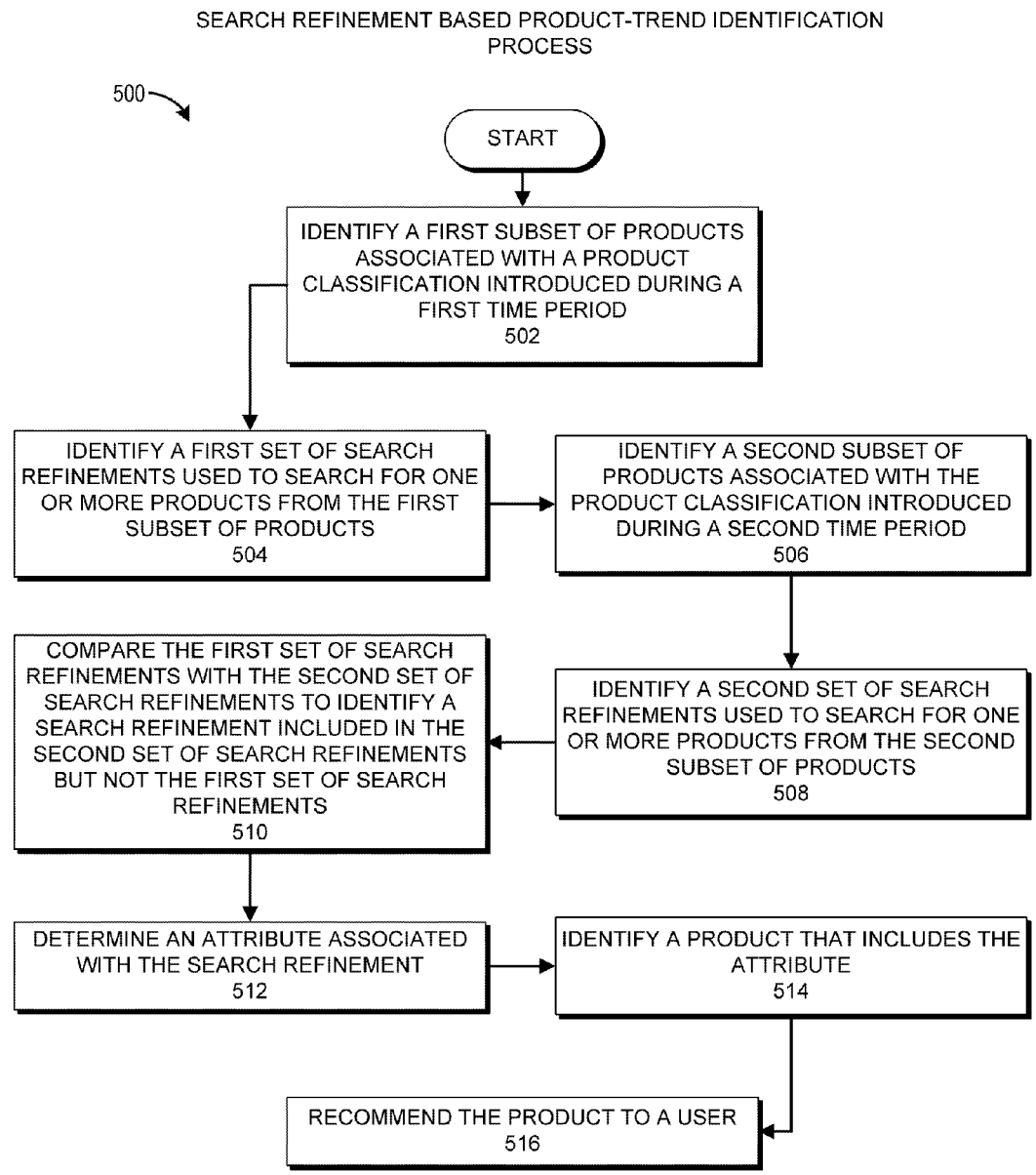
FIG. 5 illustrates a flow diagram for one embodiment of a search refinement based product-trend identification process in accordance with some embodiments of the present disclosure.

FIG. 5 illustrates a flow diagram for one embodiment of a search refinement based product-trend identification process 500 in accordance with some embodiments of the present disclosure. The process 500 can be implemented by any system that can identify product trends or product feature trends based on search refinements used to search for products. In some cases, the process 500 is used to identify changing product trends. Generally, the search refinements are options that can be used to narrow a search of an electronic catalog by, for example, selecting a link or set of checkboxes. However, in some cases the search refinements can include free form text used to refine a search. The process 500, in whole or in part, can be implemented by the interactive computing system 110, the servers 120, the recommendation system 150, the recommendation engine 152, the attribute extractor 154, the attribute vector generator 156, the attribute trend engine 160, the attribute comparator 164, the search engine 170, and the search refinement engine 172, to name a few. Although any number of systems, in whole or in part, can implement the process 500, to simplify discussion, the process 500 will be described as being generally implemented by the recommendation system 150.

The process 500 begins at block 502 where, for example, the recommendation system 150 identifies a first subset of products introduced during a first time period and associated with a product classification. The product classification may be associated with a leaf node, or a browse node without descendents in a hierarchy of product classification. Alternatively, the product classification may be an internal browse node that has one or more child or descendant nodes associated with sub-product classifications. Introduced products may generally include products made available for sale. However, in some cases, introduced products can include products that were announced or advertised regardless of whether the products are available for purchase. Further, introduced products can include products that are available for pre-order. In some cases, introduced products can include products that were previously available from sources other than an organization associated with the interactive computing system 110, but may not have been previously available from the organization.

At block 504, the recommendation system 150 using, for example, the search refinement engine 172 identifies a first set of search refinements used to search for, or refine searches for, one or more products from the first subset of products. In some cases, the first set of search refinements are identified from searches by users who purchase at least one product from the first subset of products. In other cases, the first set of search refinements are identified from searches by users who view at least one product from the first subset of products regardless of whether the user completes a purchase of the at least one product. In some instances, search refinements that are used by less than a threshold number or percentage of users may be excluded from the first set of search refinements.

In some instances, different customers, or users, may use different search refinements to search for a product. In such cases, the search refinements may be weighted based on the number or percentage of users who use each search refinement to locate a product from among a set of search results. In some embodiments, a search refinement may be weighted differently based on whether a user who used the search refinement purchased a product identified by using the search refinement or viewed the product without purchasing it. Search refinements are described further with reference to FIG. 6, which presents an electronic catalog search page that includes search refinements.

At block 506, the recommendation system 150 identifies a second subset of products introduced during a second time period and associated with the product classification. Generally, the second time period is later or more recent than the first time period. In some cases, the second time period may include a future time period. Alternatively, the second subset of products introduced include products that are available for pre-order or that have been announced or advertised, but are not yet available for purchase. In some cases, the second time period includes the current time period or the present.

In some embodiments, the second subset of products include products that have been identified as upgrades or newer models of products included in the first subset of products. As previously described, the upgrades or newer models may be identified as such by the product manufacturers, by user reviews or comments, by an analysis of the features included in the newer products compared to the features included in the older products, or by any other method of identifying an upgraded or newer model of a product. In some embodiments, block 506 includes identifying products that are upgrades or newer models of products from the first subset of products regardless of the second time period.

In some cases, the second subset of products may include products from the first subset of products. Advantageously, in some embodiments, by including products from the first subset of products in the second subset of products, the process 500 can be used to determine changes in the set of product features that are of interest to potential customers. For example, although phones with cameras have previously existed, users may not have demonstrated as much interest in having a camera on a phone until more recently. Recommendations for the products can then be modified accordingly to stress the product features that are currently of interest to potential customers. For example, during a first time period, users may search for a car based on engine power, but during a second time period, users may search for a car based on fuel efficiency. Supposing that a particular car includes a powerful engine and is fuel efficient, by determining the trends that are of interest to users during a particular time period, the recommendation system 150 can modify the focus of a recommendation to highlight the powerful engine or the fuel efficiency of the car, or in some cases both attributes or features.

At block 508, the recommendation system 150 using, for example, the search refinement engine 172 identifies a second set of search refinements used to search for, or refine searches for, one or more products from the second subset of products. In some embodiments, the block 508 can include some or all of the embodiments described above with respect to the block 504.

Using, for example, the search refinement engine 172, the recommendation system 150, at block 510, compares the first set of search refinements with the second set of search refinements to identify a search refinement included in the second set of search refinements, but not the first set of search refinements. In some embodiments, the search refinement engine 172 filters out search refinements from the first set of search refinements that are weighted below a threshold before comparing the first and second set of search refinements.

In some embodiments, some search refinements are associated with attributes that correspond to product features or product capabilities and some search refinements are associated with attributes that do not directly correspond to product features or product capabilities. For example, assuming the product classification is for cameras, search refinements that correspond to product features may include image stabilization, zoom ranges, and megapixel ranges and search refinements that do not directly correspond to product features or capabilities may include price and brand. In some cases, search refinements that do not directly correspond to product features or capabilities (e.g., price) may be filtered out from the first and second set of search refinements before comparing the first and second set of search refinements.

At block 512, the recommendation system 150 can identify one or more attributes associated with the search refinement. In some cases, the recommendation system 150 identifies a product feature associated with the attribute or search refinement. At block 514, the recommendation system 150 identifies a product that includes the attribute, or product feature. In some instances, the product is associated with the same product classification as the first and second subset of products. Alternatively, the product may be associated with a different product classification. For example, if the first product classification is televisions and the search refinement is 3D, which in this case can also be the attribute associated with the search refinement, then the identified product may include a camera or a phone with 3D functionality.

At block 516, the recommendation system 150 can recommend the product that includes the attribute to a user. In some embodiments, the recommendation system 150 can identify a prior purchase by a user of a product that is associated with the product classification, but which does not include the attribute. In such cases, based at least partly on the prior purchase and the attribute, the recommendation system can select for recommendation to the user a product associated with the product classification that does include the attribute. In some embodiments, some or all of the embodiments associated with the blocks 322 and 418 may apply to the block 516.

In some embodiments, the recommendation system 150 can infer that a product that includes the attribute represents an upgrade relative to a product that does not have the attribute.

In some embodiments, multiple search refinements may be identified that are included in the second set of search refinements, but not the first set of search refinements. In such embodiments, the search refinement engine 172 can select the search refinement with the highest weight from the multiple search refinements. In some cases, the search refinement engine 172 may select multiple search refinements based on weighting of the search refinements. When multiple search refinements are selected, the recommendation system 150 can identify products that include at least one attribute associated with at least one of the multiple search refinements. In some cases, the recommendation system 150 can identify products that include attributes for some or all of the multiple search refinements.

Advantageously, in some embodiments, the process 500 can be used to identify new product features that users are searching for. Further, the process 500 can be used to identify existing product features that users are more interested in during a current time period than during a previous time period.

In some embodiments, the recommendation system 150 can identify a set of search refinements that are used by users to search for products associated with a product classification. These search refinements may be determined during a specific time period or a search time period. The recommendation system 150 may identify the search refinements that are used at least a threshold percentage or number of times during the search time period. Attributes and/or product features that are associated with these search refinements may be classified as important to users. Conversely, attributes and/or product features that are associated with search refinement that are used less than the threshold percentage or number of times may be classified as unimportant to users by the recommendation system 150. These attributes and/or product features may or may not be new attributes or product features. In some cases, the recommendation system 150 can identify products that include the attributes or product features which are classified as important to users and can generate a recommendation for these products. In some embodiments, the recommendation system 150 may filter out search refinements that are unrelated to product features before classifying attributes as important or unimportant to users.

In some embodiments, the process 500 can be used to order customer reviews of products. For example, using the process 500, the recommendation system 150 can identify one or more attributes or product features associated with a product category that is currently of interest to a number of users. When a user navigates to a product-detail page of a product from the product category that includes one or more of the attributes or product features, the recommendation system 150 can order the customer reviews based on which customer reviews discuss or mention one or more of the attributes or product features. Alternatively, or in addition, the recommendation system 150 can highlight the customer reviews that mention the attributes or product features.

Example of an Electronic Catalog Search Page

Figure 6:
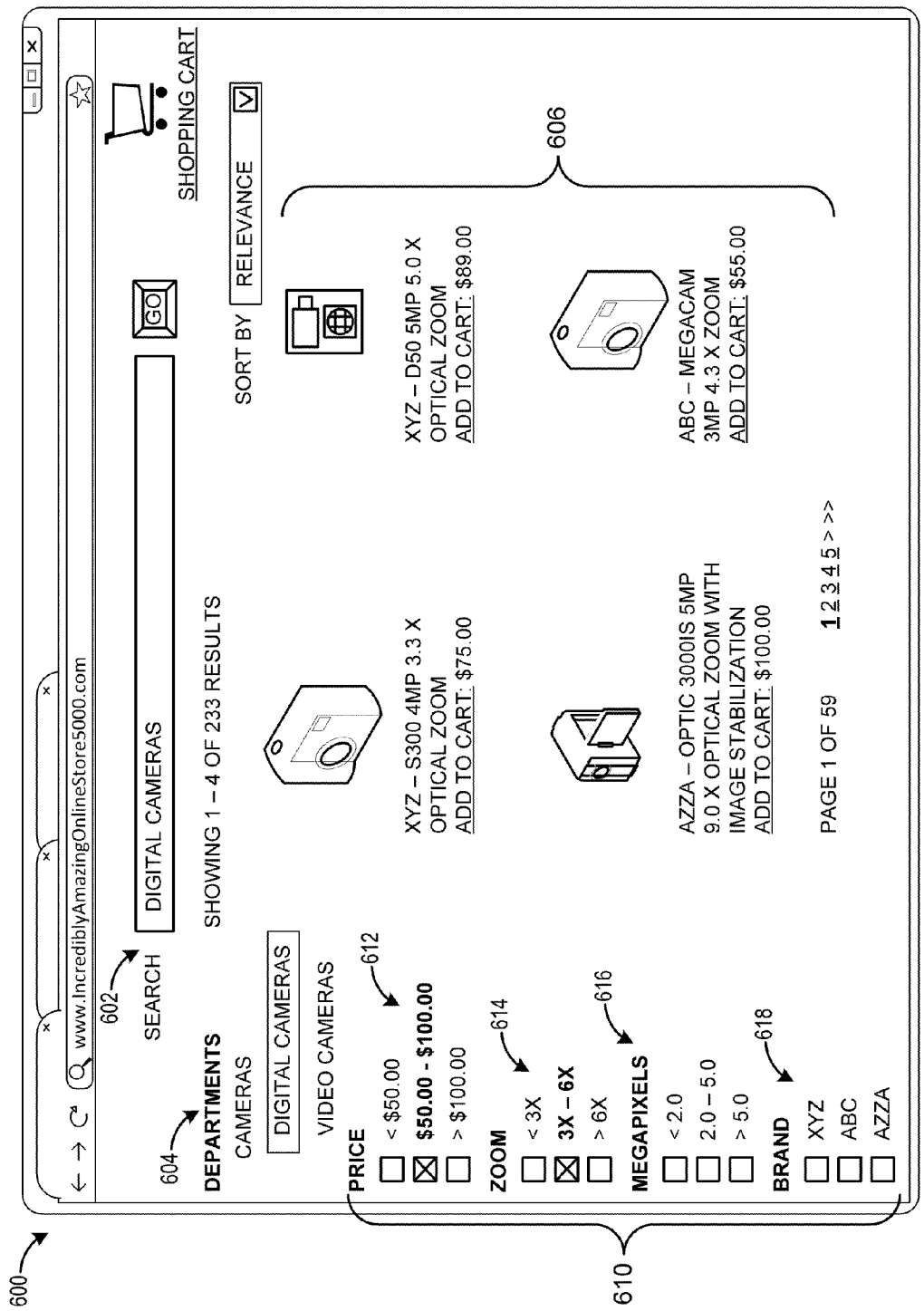
FIG. 6 illustrates an embodiment of an electronic catalog search page with search refinement options in accordance with some embodiments of the present disclosure.

FIG. 6 illustrates an embodiment of an electronic catalog search page 600 with search refinement options 610 in accordance with some embodiments of the present disclosure. The electronic catalog search page 600 can generally include any type of page for searching an electronic catalog from a catalog service 130. For example, the electronic catalog search page 600 may be a webpage associated with the interactive computing system 110. In some cases, the electronic search page 600 may be produced by search engine 170 to enable a user to search the electronic catalog.

Using, for example, search field 602, a user can search the electronic catalog for one or more products that may be listed or may have product-detail pages included with the electronic catalog. In the example illustrated in FIG. 6, a user has searched for "digital cameras." Further, as shown by the departments listing 604, "digital cameras" is a sub-department of "cameras" and has a sibling department of "video cameras", which is also a sub-department of "cameras." In some embodiments, the department listings may correspond to browse nodes in the electronic catalog. Thus, "digital cameras" and "video cameras" may both be leaf browse nodes, which are descendants of the internal browse node "cameras." Further, the departments listings, in some cases, may correspond to product classifications. For example, the department "digital cameras" may correspond to the product classification "digital cameras" and/or the browse node "digital cameras."

In response to the user initiating a search of the electronic catalog, the catalog search page 600 can present the user with a set of search results 606, which may be obtained using the search engine 170. Further, the catalog search page 600 can present the user with a set of available search refinement options 610 based on the search initiated by the user. In some embodiments, the search refinement engine 172 may generate the search refinement options 610.

Generally, different searches and different product classifications result in different search refinement options being included with the available search refinement options 610. For example, as depicted in FIG. 6, a search for digital cameras may include the following available search refinement options 610: price 612, zoom 614, megapixels 616, and brand 618. In some cases, some search refinement options may be available for any product search that generates non-zero search results. For example, price 612 and brand 618 may be search refinement options that are available for any search that produces non-zero search results. However, the options for each of the search refinement options may differ based on the search. For example, price search refinement options may differ based on whether the product is a camera, a television, or toothpaste as the range of prices for these example products generally differ.

In some cases, the search refinement options 610 are specific to the result of the search. For example, as shown in FIG. 6, a search for digital cameras can result in available search refinement options of zoom 614 and megapixels 616. However, a search for video games is unlikely to include the zoom 614 and megapixels 616 search refinement options. Instead, a search for video games may include a search option based on video game type (e.g., action, adventure, sports, etc.) or based on video game rating.

The available search refinement options 610 may be determined by identifying attributes associated with products that are associated with a product classification. For example, if the search refinement engine 172 determines that a threshold percentage of products associated with the digital cameras classification include information relating to zoom, the search refinement engine 172 can generate the zoom 614 search refinement option to present to users searching for digital cameras. Further, the search refinement engine 172 can determine the options to include with the zoom 614 search refinement based on the number of cameras that are associated with a specific option. For example, assume that approximately 25% of cameras have zoom capability less than 3×, 50% of cameras have zoom capability between 3× and 6×, and the remaining 25% of cameras have zoom capability greater than 6×. In such a case, the zoom 614 search refinement can provide a user with the option of narrowing a search for digital cameras based on the zoom options of <3×, 3×-6×, and >6×.

In some cases, product manufacturers may specify the available search refinement options 610. Alternatively, the available search refinement options may be manually determined by an employee of an organization associated with the interactive computing system 110. In some cases, the search refinements may be automatically generated based on an analysis of the products associated with a product category. Alternatively, the search refinements may be predetermined. In some cases, the initial search refinements associated with a product category may be determined manually and then modified automatically based on how often users use the different search refinement options.

In some embodiments, the search refinement options 610 may change over a period of time. For example, during one time period the megapixels 616 search refinement may include the following options: <1.0, 1.0-2.0, and >2.0. However, during a more recent time period, as depicted in FIG. 6, the megapixels search refinement options may include: <2.0, 2.0-5.0, and >5.0. As technology advances, these search refinement ranges may further change. In addition, some search refinement options may disappear over time as product features become standard thereby eliminating their effectiveness as a way to narrow a product search. For example, if every camera includes image stabilization, a search refinement option based on whether or not a camera includes image stabilization becomes moot and can be removed from the search refinement options 610. Thus, if the search refinement engine 172 determines that 100%, or substantially close to 100% of cameras include image stabilization, the search refinement engine 172 may eliminate image stabilization as a possible search refinement. Similarly, as technology progresses, new search refinement possibilities may be added. For instance, the option of taking 3D pictures may be added to the search refinement options 610 as cameras are produced with this feature.

As previously described with respect to FIG. 5, the search refinements used by users to search for products during different time periods can be used as a source of information to determine product features to recommend to potential customers. In some cases, new product features may be identified by comparing the search refinements used by users during different time periods. Further, in some cases, new product features of interest, whether or not the product features are newly available, may be identified by comparing the search refinements used by users during different time periods.

In some embodiments, the product details or product features that are listed as part of the search results 606 may be associated with one or more search refinements that are used by a threshold number or percentage of users to search for products within the product classification. For example, the product features listed as part of the search results 606 may be associated with the attribute identified at block 512 of the process 500.

In some cases, new product features or attributes, or product features and attributes that are newly of interest to users may be presented to users in the search field 602 as part of an in-line search suggestion. For example, if it is determined using, the process 500 for instance, that image stabilization is a currently popular product feature for digital cameras, then when a user enters "digital cameras" into the search field 602, the recommendation system 150 may cause the search field 602 to suggest "digital cameras with image stabilization" as a search.

As has been previously described, search refinements used with the process 500 may be obtained from the search refinement options 610. However, in some cases, search refinements used by users to search for products may be identified from the search field 602. For example, if a user first searches for "digital cameras" and then searches for "digital cameras 3D pictures," 3D pictures, or three dimensional pictures, may be identified as a search refinement. In some cases, the user may use "digital cameras 3D pictures" as the initial search string. In such cases, the recommendation system 150 may identify that "3D pictures" is a search refinement for "digital cameras" based on, for example, that digital cameras is a product classification or browse node, but "3D pictures" may not be its own "browse node." Further, in some cases, the search field 602 may be the only source of search refinements that are used with the process 500. Thus, process 500 may be performed without the refinement options 610 being presented on the electronic catalog search page 600. In other cases, a combination of the search refinement options 610 and the search refinements used with the search field 602 may be used with the process 500.

Typically, the search refinement options 610 are generated based on the product searched for in the electronic catalog. However, in some cases, a user may use a text field to enter search refinements, which may or may not be limited based on the product search.

Second Example of a New Feature Recommendation Process

Figure 7:
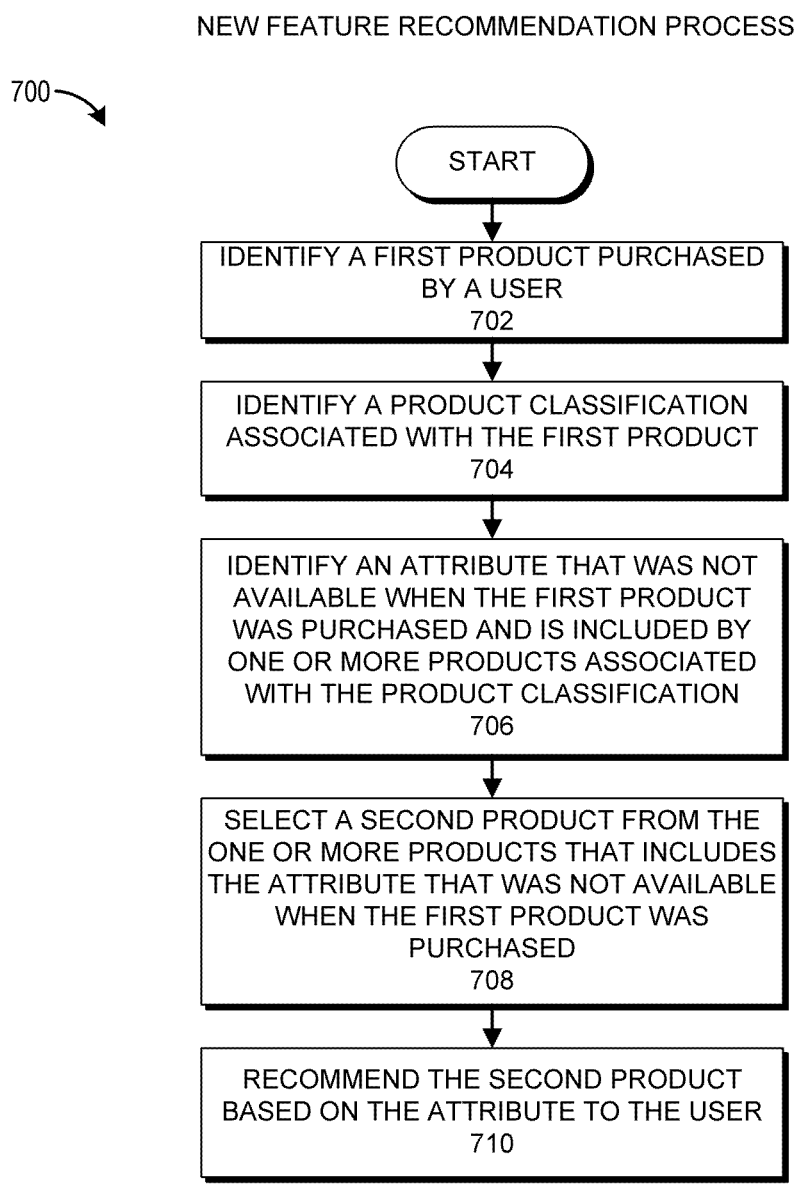
FIG. 7 illustrates a flow diagram for one embodiment of a new feature recommendation process in accordance with some embodiments of the present disclosure.

FIG. 7 illustrates a flow diagram for one embodiment of a new feature recommendation process 700 in accordance with some embodiments of the present disclosure. The process 700 can be implemented by any system that can identify a product to recommend based on the determination that the product includes an attribute and/or product feature that was not previously available. For example, the process 700, in whole or in part, can be implemented by the interactive computing system 110, the servers 120, the recommendation system 150, the recommendation engine 152, the attribute extractor 154, the attribute vector generator 156, the attribute trend engine 160, and the attribute comparator 164, to name a few. Although any number of systems, in whole or in part, can implement the process 700, to simplify discussion, the process 700 will be described as being generally implemented by the recommendation system 150.

The process 700 begins at block 702, where, for example, the recommendation system 150 identifies a first product purchased by a user. In some embodiments, some or all of the embodiments described above with reference to the blocks 302 and 402 may apply to the block 702.

At block 704, the recommendation system 150 identifies a product classification associated with the first product. In some embodiments, some or all of the embodiments described above with reference to the block 304 may apply to the block 704.

Using at least one of any number of methods, including various embodiments of the methods described above with respect to the processes 300, 400, and 500, the recommendation system 150 identifies an attribute that was not available when the first product was purchased and is included by one or more products associated with the product classification at block 706. This attribute may be associated with a product feature that was not available at the time the first product was purchased.

At block 708, the recommendation system 150 selects a second product from the one or more products that includes the attribute that was not available when the first product was purchased. Further, the second product may include a new product feature associated with the attribute. In some embodiments, the second product may correspond to the first product with additional product features that were not available for the product when the first product was first available. For example, the first product and the second product may both be video game XYZ. However, the second product may include an expansion pack for the video game XYZ that was not available when the video game was purchased by the user. In some embodiments, some or all of the embodiments described above with reference to the blocks 320, 416, and 514 may apply to the block 708.

At block 710, the recommendation system 150 recommends the second product based on the attribute to the user. The recommendation may include a discount for the product or any other type of incentive that may be offered in an attempt to increase the likelihood that the user purchases the second product. Further, the recommendation may indicate that the second product, the attribute, or the product feature associated with the attribute were not available when the first product was obtained. In some embodiments, some or all of the embodiments described above with reference to the blocks 322, 418, and 516 may apply to the block 710.

In some embodiments, one or more of the previously described processes can be used to identify multiple attributes, product features, or products. Thus, for example, the process 300 can be used to identify multiple product features in a product and/or to identify multiple products that may include one or more new product features.

In some embodiments, some or all of the results of the analyses performed as part of the processes described herein (e.g., determination of a new product feature at the block 318) can be stored in one or more databases (e.g., product data repository 146) associated with the interactive computing system 110. Further, the databases can include additional metadata relating to the attributes and product features identified using the processes herein. For example, the product data repository 146 can store information relating to when new product features became available, when attributes or product features associated with a product changed, or what new product features caused or did not cause a threshold change in sales of a product. This information can be used in a number of different processes. For example, the information can be used to highlight product and/or customer reviews that discuss popular product features. As a second example, the information can be used to identify new product features to users. Further, the information can be used to identify product features that have increased in popularity based on, for example, the percentage of searches that identify the product features or based on the percentage of recommendations that highlight the product features to users that result in sales.

Terminology

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the recommendation system 150 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 3, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for identifying a product to recommend to a user, the method comprising:

determining, for an item category, based on an analysis of item purchases of a plurality of users, an upgrade purchase interval for the item category, the upgrade purchase interval representing a statistical amount of time users wait to replace a purchased item in the item category with an upgraded item;

determining, by a computer system, that a first item in the item category represents an upgrade relative to a second item in the item category, said determining comprising detecting that the first item has a feature that the second item does not have;

selecting a user that previously purchased the second item; and outputting a recommendation of the first item for presentation to the user based on the user's prior purchase of the second item, wherein outputting the recommendation comprises using the upgrade purchase interval to control a timing of the recommendation relative to a timing of the user's purchase of the second item.

2. The method of claim 1, wherein the statistical amount of time comprises an amount of time that a percentage of users wait to replace the purchased item in the item category with the upgraded item.

3. The method of claim 1, wherein the statistical amount of time comprises an average amount of time that the users wait to replace the purchased item in the item category with the upgraded item.

4. The method of claim 1, wherein determining that the first item in the item category represents an upgrade relative to the second item in the item category comprises comparing attributes of a first set of items in the item category associated with a first time period with attributes of a second set of items in the item category associated with a second time period, wherein:

the first item is associated with the first set of items and the second item is associated with the second set of items; and the first time period is more recent than the second time period.

5. The method of claim 1, wherein determining that the first item in the item category represents an upgrade relative to the second item in the item category comprises comparing attributes of a first set of items in the item category associated with search refinements used by a first set of users to search for the first set of items with attributes of a second set of items in the item category associated with search refinements used by a second set of users to search for the second set of items, wherein the first item is associated with the first set of items and the second item is associated with the second set of items.

6. The method of claim 1, wherein determining that the first item in the item category represents an upgrade relative to the second item in the item category comprises determining that the feature was not available in the item category when the user purchased the second item.

7. The method of claim 1, wherein outputting the recommendation further comprises informing the user of the upgrade purchase interval.

8. The method of claim 1, wherein the recommendation is based further on an automated determination that the feature was not available when the user purchased the second item.

9. The method of claim 1, wherein outputting the recommendation comprises notifying the user that the first item includes a feature that was not available when the user purchased the second item.

10. The method of claim 1, further comprising automatically generating, based on recorded user behaviors, a measure of a level of importance of the feature to users, and considering said measure as a factor in determining whether to recommend the first item to the user.

11. A system for generating recommendations, comprising:
a first computer data repository that stores purchase data reflective of purchases made by a plurality of users;
a second computer data repository that stores item data for a plurality of catalog items; and
a recommendation system comprising one or more computing devices, said recommendation system configured to perform a process that uses the purchase data and the item data to generate upgrade recommendations, said process comprising:
determining, for an item category, based on an analysis of the purchase data, an upgrade purchase interval for the item category, the upgrade purchase interval representing a statistical amount of time users wait to replace a purchased item in the item category with an upgraded item;
determining that a first item in the item category represents an upgrade relative to a second item in the item category, said determining comprising determining that the first item has a feature that the second item does not have;
selecting a user that previously purchased the second item; and
outputting a recommendation of the first item for presentation to the user based at least partly on the user's prior purchase of the second item, wherein outputting the recommendation comprises using the upgrade purchase interval to control a timing of the recommendation relative to a timing of the user's purchase of the second item.

12. The system of claim 11, wherein the statistical amount of time is an amount of time that users typically wait to replace a purchased item in the item category with an upgraded item.

13. The system of claim 11, wherein the recommendation system is configured to determine that the first item in the item category represents an upgrade relative to the second item in the item category by a process that comprises comparing attributes of a first set of items in the item category associated with a first time period with attributes of a second set of items in the item category associated with a second time period, wherein:
the first item is associated with the first set of items and the second item is associated with the second set of items; and
the first time period is more recent than the second time period.

14. The system of claim 11, wherein the recommendation system is configured to determine that the first item represents an upgrade relative to the second item by a process that comprises comparing attributes of a first set of items in the item category associated with search refinements used by a first set of users to search for the first set of items with attributes of a second set of items in the item category associated with search refinements used by a second set of users to search for the second set of items, wherein the first item is associated with the first set of items and the second item is associated with the second set of items.

15. The system of claim 11, wherein the recommendation system is further configured to inform the user of the upgrade purchase interval.

16. The system of claim 11, wherein the recommendation system is further configured to base the recommendation on an automated determination that the feature was not available in the item category when the user purchased the second item.

17. The system of claim 11, wherein the recommendation system is further configured to:
generate, based on recorded user behaviors, a measure of a level of importance of the feature to users; and
consider said measure in determining whether to provide said recommendation.

18. The system of claim 11, wherein the recommendation system is configured to output the recommendation with an indication that the first item includes a product feature that was not available when the user purchased the second item.

19. Non-transitory computer storage having stored thereon executable instructions that, when executed by a computing system, cause the computing system to perform a process that comprises:
determining, based on an analysis of item purchases of a plurality of users, an upgrade purchase interval for an item category, the upgrade purchase interval representing a statistical amount of time users wait to replace a purchased item in the item category with an upgraded item;
determining that a first item in the item category represents an upgrade relative to a second item in the item category, said determining comprising determining that the first item has a feature that the second item does not have;
selecting a user that previously purchased the second item; and
outputting a recommendation of the first item for presentation to the user based at least partly on the user's prior purchase of the second item, wherein outputting the recommendation comprises using the upgrade purchase interval to control a timing of the recommendation relative to a timing of the user's purchase of the second item.

20. The non-transitory computer storage of claim 19, wherein the statistical amount of time is an amount of time that users typically wait to replace a purchased item in the item category with an upgraded item.

21. The non-transitory computer storage of claim 19, wherein determining that the first item represents an upgrade relative to the second item comprises comparing attributes of a first set of items in the item category associated with a first time period with attributes of a second set of items in the item category associated with a second time period, wherein:
the first item is associated with the first set of items and the second item is associated with the second set of items; and
the first time period is more recent than the second time period.

22. The non-transitory computer storage of claim 19, wherein determining that the first item represents an upgrade relative to the second item comprises comparing attributes of a first set of items in the item category associated with search refinements used by a first set of users to search for the first set of items with attributes of a second set of items in the item category associated with search refinements used by a second set of users to search for the second set of items, wherein the first item is associated with the first set of items and the second item is associated with the second set of items.

23. The non-transitory computer storage of claim 19, wherein determining that the first item in the item category represents an upgrade relative to the second item in the item category comprises determining that the feature was not available when the user purchased the second item.

24. The non-transitory computer storage of claim 19, wherein outputting the recommendation further comprises informing the user of the upgrade purchase interval.

25. The non-transitory computer storage of claim 19, wherein the recommendation is based further on an automated determination that the feature was not available when the user purchased the second item.

26. The non-transitory computer storage of claim 19, wherein outputting the recommendation comprises notifying the user that the first item includes a feature that was not available when the user purchased the second item.

27. The non-transitory computer storage claim 19, wherein the process further comprises automatically generating, based on recorded user behaviors, a measure of a level of importance of the feature to users, and considering said measure as a factor in determining whether to recommend the first item to the user.

* * * * *